Dec. 15, 1931.  A. S. HARRINGTON  1,836,920
FILTER
Filed Feb. 8, 1929   3 Sheets-Sheet 1
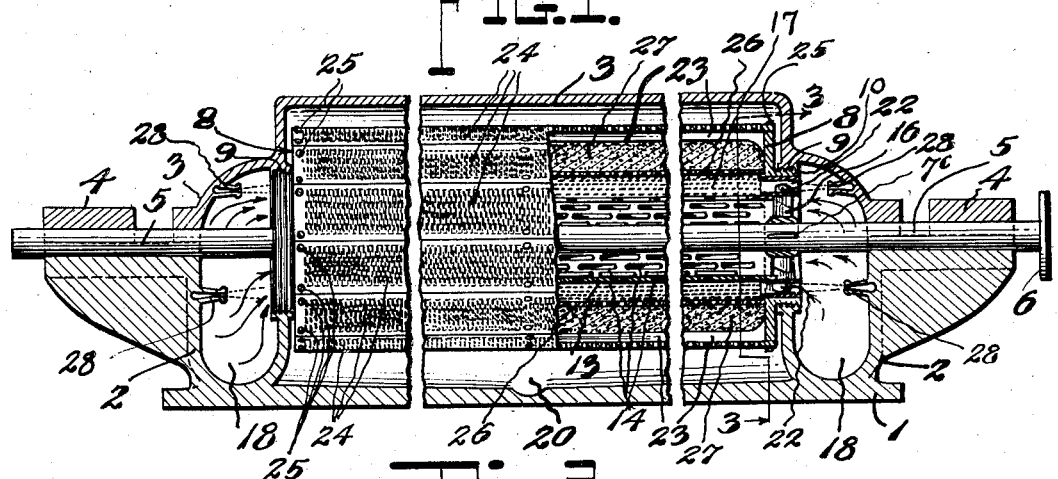
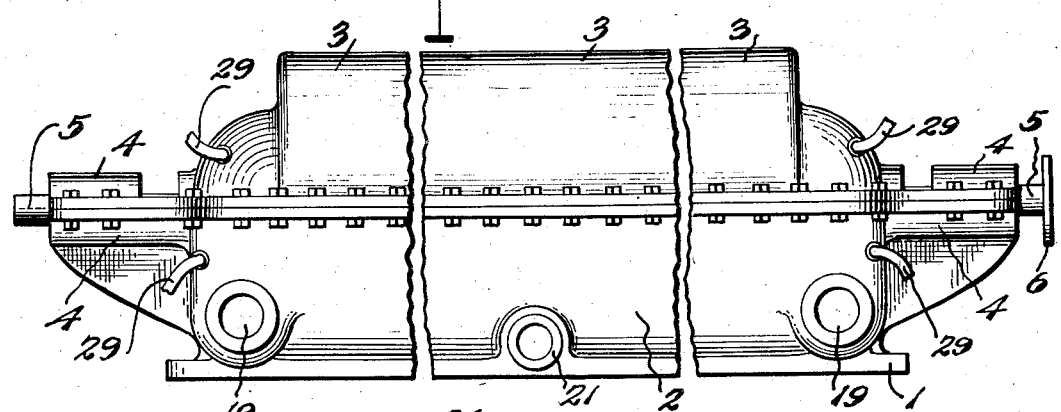
Inventor
A. S. Harrington
By Edgar M. Kitchin,
his Attorney

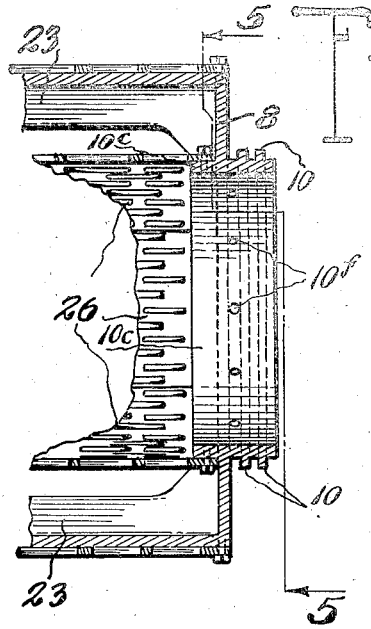
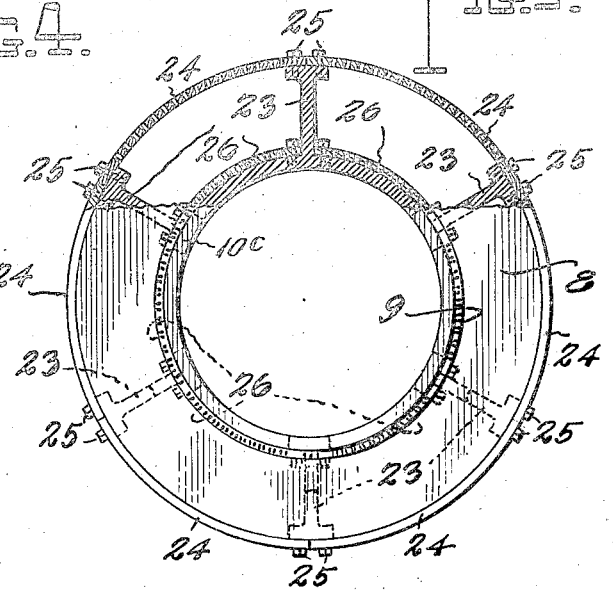
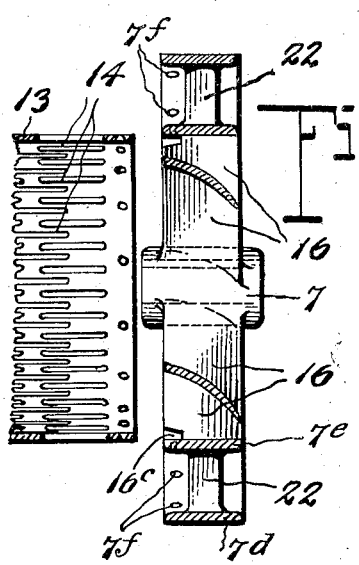
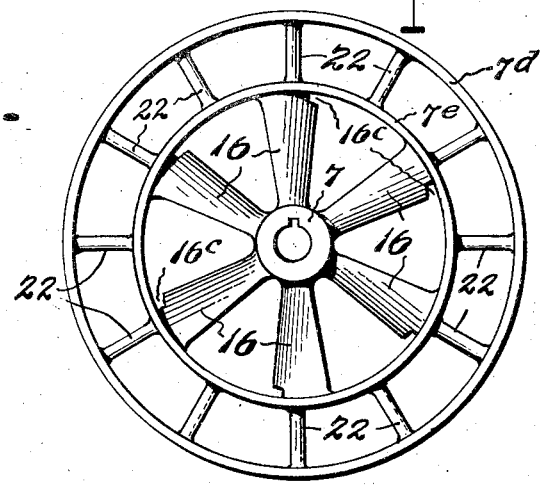

Dec. 15, 1931.  A. S. HARRINGTON  1,836,920
FILTER
Filed Feb. 8, 1929  3 Sheets-Sheet 3
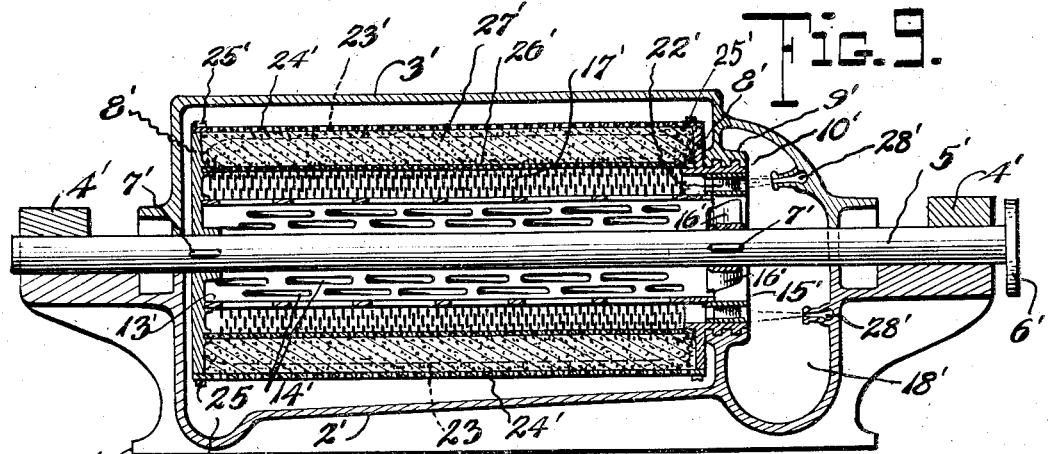
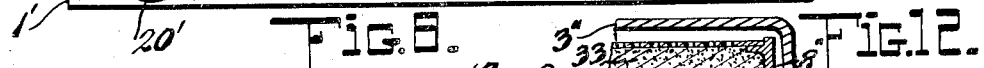
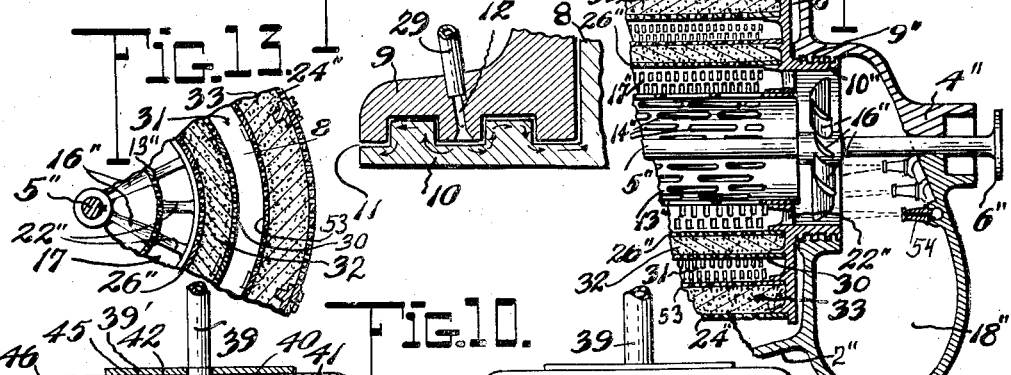
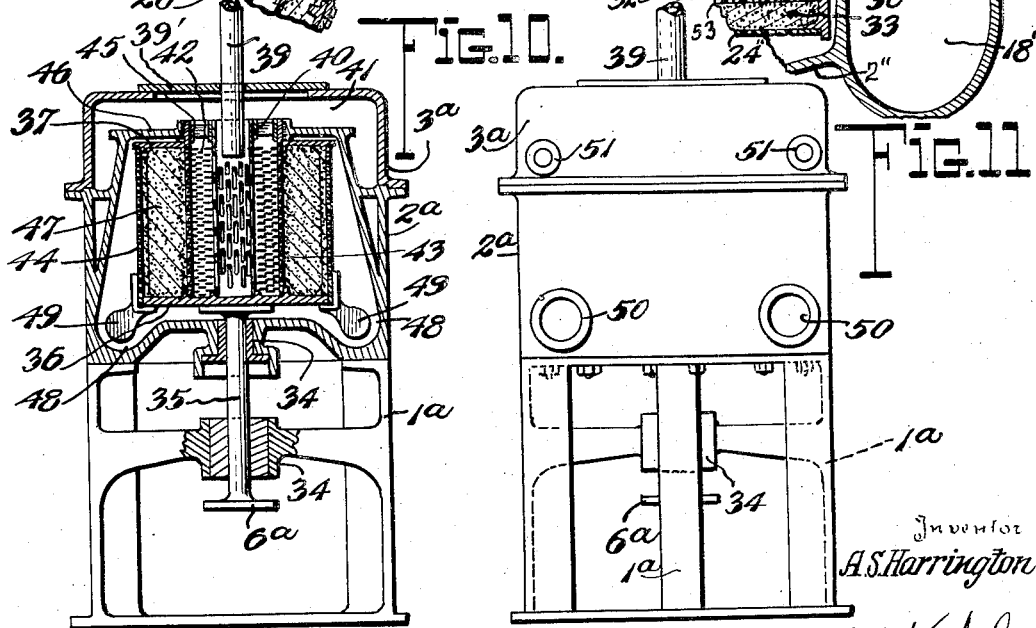
Inventor
A. S. Harrington
By Edgar M. Kitchin
his Attorney Patented Dec. 15, 1931

1,836,920

UNITED STATES PATENT OFFICE

ARTHUR S. HARRINGTON, OF OMAHA, NEBRASKA

FILTER

Application filed February 8, 1929. Serial No. 338,576.

This invention relates to improvements in filters of the type in which centrifugal force is utilized as supplementing means for increasing the rate of flux through the filter.

Among the objects in view is the effective filtering and treating or processing of fluids and liquids for cleansing the same or changing the bacterial or chemical content thereof, whether dust-charged air, chimney or other gases, or water, sewage, oil, syrup, industrial wastes, or other fluids or liquids.

A more detailed object is the supplementing of the fluid pressure head by centrifugal force while eliminating undue turbulence.

A further object in view is the delivery of the fluid to be filtered along a path at an angle to the direct line of approach of such fluid to and through the filter while largely obviating agitation of the fluid or movement thereof in a direction different from the direction of advance through the filter.

A still further object in view is the maintenance of a quiescent area of fluid to be filtered between the filter and the influent stream.

In greater detail, an object of the invention is the provision of means effective for filtering purposes and adapted to enable reverse flow and washing jet cleansing.

With these and further objects in view, as will in part hereinafter become apparent and in part be stated, the invention comprises certain novel constructions, combinations, and arrangements of parts as subsequently specified and claimed.

In the accompanying drawings,—

Figure 1 is a vertical, central section through an apparatus embodying the features of the present invention, a fragment of the filter drum being seen in elevation.

Figure 2 is a view in side elevation of the parts seen in Figure 1.

Figure 3 is an enlarged, detailed, transverse-axial section of a fragment of the filter drum.

Figure 4 is a detailed, fragmentary section similar to Figure 1 of the drum detached and with the filter filler or bed omitted, the parts being shown on a scale enlarged relative to the scale of Figure 1 but reduced with respect to the scale of Figure 3.

Figure 5 is a sectional elevation taken on the planes indicated by line 5—5 of Figure 4, and looking in the direction indicated by the arrow.

Figure 6 is a dissembled view of the hub and spoke section and central cylinder detached, the parts being seen on substantially the scale of Figure 3.

Figure 7 is an end view of the said spoke section detached.

Figure 8 is an enlarged, detailed, sectional view through one of the labyrinth glands.

Figure 9 is a longitudinal, vertical, central section through a slightly modified embodiment, the drive shaft being seen in elevation.

Figures 10 and 11 are views similar, respectively, to Figures 1 and 2 of a further modified embodiment.

Figure 12 is a view similar to the righthand portion of Figure 1 of a further modified embodiment.

Figure 13 is a view similar to Figure 3 of the parts seen in Figure 12 on a slightly enlarged scale.

Referring to the drawings by numerals, 1 indicates a base with which the lower half of the filter housing 2 is preferably cast integral and finished to detachably receive the upper half 3 of the housing. The two halves or sections of housing are preferably marginally flanged and bolted together, as seen in Figure 2.

The housing is formed at each end with an influent space 18 with each of which communicates the respective influent port 19, as seen in Figure 2, and the casting making up the section 2 is sufficiently larger than the contained filter drum to leave an effluent space at the lower part of the casting, indicated at 20 in Figure 1, which communicates with a discharge or effluent port 21, as seen in Figure 2.

The housing sections are formed terminally with journal bearings 4, 4, in which the drive shaft 5 is journaled. Shaft 5 is provided with the usual bolting flange 6 for hook up to the source of power, not illustrated.

Mounted on the shaft 5 near the respective ends of the housing, and preferably keyed thereto, are hub sections, one of which is seen in detail in Figures 6 and 7, and each of which is provided with a hub 7 keyed at 7c to the shaft. Each of said hub sections consists of an outer ring 7d and an inner, concentrically-arranged ring 7e connected to the outer ring by short radial spokes 22 while the inner ring 7e is connected by fan blade or impeller blade spokes 16 to the hub 7.

Each hub section is arranged with its respective outer ring 7d mounted within and snugly fitting an annular boss or axially-extending flange 10 on the respective drum head 8 of the filtering drum. Each ring 7d is preferably provided with apertures 7f registering with corresponding apertures 10f in the respective flange 10. Connecting bolts or other securing pins are arranged to extend through the apertures 7f and 10f to secure the parts in the operatively assembled relation. Each end section has its impeller blades 16 notched at 16c for purposes hereinafter specified.

Each boss or flange 10 is formed in its outer surface preferably with a series of encircling ribs and grooves cooperating with opposing and interlacing ribs and grooves on an annular flange 9 preferably cast integral with the respective end of the surrounding housing. The labyrinth formed by the grooves and ribs of the parts 9 and 10 offers an obstructing path against leakage. When desired, to afford greater insurance against leakage, a bleeder tube 29 may deliver treated fluid through port 12 to the space 11 between the parts 9 and 10 under sufficient pressure to cause the intrickling liquid to take the courses indicated by the arrows in Figure 8, and thus prevent leakage past the thus formed labyrinth gland in either direction.

The notches 16c of the respective hub and spoke sections are arranged and adapted to receive the corresponding ends of an inner foraminous cylinder 13. The openings in the cylinder 13 may, of course, be of any desired shape, but are preferably elongated to form slots 14 of a size not intended for filtering or screening purposes, the cylinder functioning essentially to reduce or eliminate agitation. The cylinder 13, when its ends are seated in notches 16c, is located concentrically with shaft 5.

The cylinder heads 8 are connected by and preferably formed integral with longitudinal beams 23, which beams are preferably of the commercial T-shape, but may be otherwise shaped, and may also be otherwise connected to the drum heads 8. Extending inwardly from each drum head 8, preferably as an endwise extension of boss 10, is a flange 10c, Figure 4, to which is preferably detachably fixed a filter bed retaining screen 26. The screen 26 is adapted to be variable in formation, according to the work to be done, and preferably consists of foraminous, segmental plates of a length substantially equal to the length of the space between the drums heads 8 and of a width angularly sufficiently small to be inserted between the beams 23 when being assembled, so that the screen 26 may be readily mounted and bolted in place, as clearly seen in Figures 4 and 5, when the parts are being assembled. The filter bed retaining screen 26 is spaced outward from the cylinder 13, as best seen in Figure 1, leaving therebetween a cylindrical quiet area or space 17. This space is continuous endwise of the space between the respective rings 7e and 7d and communicates directly with the influent source comprised of the respective influent space 18 at the corresponding end of the filter. The structures of the filter ends being duplicates, a specific description of one only is necessary.

Preferably detachably bolted to the outer surfaces of the T-beams 23 are the segmental plates of the filter bed retaining screen or grid 24, the plates being secured by bolts 25 engaging the respective flanges of the beams 23. The screen or grid 24 is appropriately spaced from the screen 26, and a filtering and/or processing media is interposed between the two. The media is, of course, as a matter of convenience of assemblage, introduced before the grid segments 24 are applied. The interposed filter bed may be of screening, of woven fiber, or of comminuted filtering material, such as sand, fuller's earth, zeolite, barytes, or other appropriate filtering or treating material forming the bed 27. The filtering or treating bed 27 may also be formed of previously cast porous materials, such as sil-e-cel-silica-jell-magnesia blocks or other porous materials. Since the foraminous cylinders or screens 24 and 26 and their end connections act as a unit in carrying the filter bed 27, said screen and end connections constitute a filter drum.

During operation, the fluid to be filtered is delivered through the intake ports 19 and the intake spaces 18 into the open ends of the quieting cylinder 13. A small amount may also find its way between rings 7e and 7d into the space 17, but the amount will be negligible, and, but for the action of cleansing jets hereinafter mentioned, the rings 7e and 7d might well be connected by a continuous web in lieu of spokes 22. During the supplying of the fluid to the filter, shaft 5 is rotated at a rate sufficient to add centrifugal force to the fluid head under which the fluid approaches the filter. The revolution of the parts causes the blades 16 to add an impelling force to the incoming fluid tending to cause most or all of the flow toward and into the cylinder 13, and therefrom radially out through the slots 14 across the path of any slight inflow directly into the quiet area 17 which breaks up the tendency toward any longitudinal current or current at right angles to the direction of force of the centrifugal action. The initial fluid head, therefore, is added directly to the centrifugal force to cause the liquid to pass through the filtering media or other treating bed 27 and out through the filtering grid 24. It is obvious, of course, that the screens or grids 24 and 26 while shown relatively coarse will be sufficiently fine for the purpose at hand, and may be in the form of a fine mesh screen or fabric supported by a substantial metallic frame or screen when desired. The fluid advancing through the filter bed passes out through the grid 24 and finds it way to the lower portion of the casing 2, and thence to and through the discharge ports 21. This filtering or treating action is continued as required until slowed down objectionably by deposits on the inner surface of screen 26 or within the inner areas of the bed 27. When this occurs, the supply of filtered discharge through the effluent port 21 is cut off, and a supply of water or other cleansing fluid is directed in a reverse direction through the port 21. The inflow ports 19 are cut off from the influent supply and connected to the discharge to allow the reverse current flowing into the outer portion of the casing 2—3 to pass through the filter bed and out through the normal intake openings 18 and normal inake ports 19. This reverse flow is continued until the parts are thoroughly cleansed.

To facilitate cleansing, the outer surface of the cylinder 13 and the inner surface of the screen 26 may be scoured by jets of cleansing fluid projected through nozzles 28 supplied at requisite pressure through supply pipes 29. The jets 28 may be operated with the filter otherwise quiescent and no influent or effluent therefrom save from said jets, or the jets may be caused to operate during the reverse cleansing current operation to increase the internal agitation and thus release lodged solids. When the cleansing operation has been completed, the ports 19 are again connected with the fluid supply, and port 21 again connected with the place of discharge or delivery of filtered or treated fluid.

In Figure 9 is illustrated an embodiment of the same invention as just set forth, varying therefrom essentially only in being a single end filter instead of a double end filter; that is to say, being provided with an influent port at one end only and an effluent port at the other instead of having the influent at both ends and the effluent from the middle. The form seen in Figure 9 is preferable for many purposes from a commercial viewpoint, but, of course, is not capable of as rapidly handling as large bulk of material to be filtered as is the form seen in Figure 1.

In greater detail, the structure seen in Figure 9 comprehends the base 1', casing sections 2' and 3', and driving shaft 5' journaled in the bearings 4' forming a part of the base 1' and casing 2'. Drum head 8' at the right, is keyed, at 7', through an appropriate hub and spoke section to the shaft 5'. Drum heads 8' carry the quieting or direction changing cylinder 13' and the drum screens 26' and 24' spaced to accommodate the interposed filter bed 27'. Beams 23' similar in structure and function to beams 23 are employed. The cylinder 13' is provided with slots 14' proportioned to allow ready flow of fluid therethrough, and not intended to serve as a filter but only to effect the change of direction of the flow from portions of fluid surrounding the drive shaft to the column of fluid in the quieting area 17' between the cylinder 13' and screen 26'. The drum head 8' at the left, as seen in Figure 4, is keyed directly to and revolves with the drive shaft 5', and is spaced from the adjacent end of the housing 2', 3'. Drum head 8' at the right is provided with the labyrinth gland formed between itself and the surrounding flange 9' of the enclosing casing. The hub and spoke section of the last-mentioned head 8' includes the usual inner and outer rings and their short spokes, and also the hub and interposed fan blades 16'. The housing or enclosing casing for the filter drum is provided at one end with an influent space 18', and at the opposite end with the effluent space 20' communicating respectively with the influent and effluent pipes or ports similar to those above described with respect to Figure 2.

The operation is substantially the same as that above described with the exception that the material being filtered or otherwise treated enters from one end only and discharges from the other end. Penetration of or flux through the filter bed is aided by the centrifugal force incident to revolution of the filter bed; and the lower casing 2' is preferably inclined slightly to effect drainage to the effluent space 20'. Cleansing is effected by the reverse action, as above described, supplemented when and as desired by cleansing jets from nozzles 28', 28'.

In Figures 10 and 11 is illustrated a structure similar to that seen in Figure 9, and differing therefrom essentially and chiefly in the vertical disposition of the axis of rotation instead of horizontal, and the features incident to such disposition. A suitable framework or base 1a supports a housing or casing 2a on which is superimposed the upper section 3a. Vertically disposed journal bearings 34, 34, are sustained, respectively, by the base 1a and bottom portion of casing 2a, in which bearings is journaled the drive shaft 35 having the power hook-up flange 6a. To the upper end of the shaft 35 and resting thereon is fixed the head 36 of the filtering drum whose opposite head 37 is fixed to the filtering screens or grids 43 and 44 having interposed therebetween the filter or treating bed 47. The head 37 is preferably provided with an upwardly extending annular flange or boss 45 having a labyrinth gland cooperating with the horizontal division plate 46 of the lower or main casing 2a to guard against leakage between filtrate and non-treated material. A quieting cylinder 40 similarly slotted to the slots 14 (of the structure seen in Figure 1) is arranged within and concentric to the inner screen or grid 43 and spaced therefrom to provide the quiet area 42. The interior of the cylinder 40 communicates directly with the influent supply pipe 39. The lower section 2a is provided with an effluent space 48, and the head 36 preferably carries impeller blades 49, functioning by centrifugal force to tend to discharge fluid from the space 38 through the effluent ports 50, 50. Ports 51, 51 are provided in the upper section 3a communicating with the space 41 inclosed by section 3a, but ports 51 are normally closed, and are opened only when a reverse cleansing action is taking place. Supply pipe 39 snugly fits and extends through a cover plate 39' detachably fixed to the top of section 3a, and closing the opening in said top. Reverse cleansing in this embodiment does not require reverse flow in pipe 39 which is merely shut off during the cleansing action or used to take the place of the cleansing jets of the other embodiments.

The operation of the structure seen in Figures 10 and 11 is not widely or materially different from that above described, and includes introduction of the fluid to be filtered through supply pipe 39 within slotted cylinder 40, and from the same through the filter drum, including screen or grid 45, bed 47, and screen or grid 44. The advance of the filtering fluid is enhanced by the centrifugal force. During regular operation, cover plate 39' may be removed for watching filtering action; but is to be replaced for the reverse or cleansing action.

In Figures 12 and 13 is illustrated a still further embodiment which may be looked upon for purposes of the appended claims as the preferred embodiment, since it involves substantially the same features as Figures 1 and 9 with the added feature of an interposed quieting area between spaced treating units or filter beds. The structure in detail includes the lower section 2" and upper section 3" of the enclosing casing, in which is mounted the filter drum fixed to and driven by power shaft 5" having the power hook-up flange 6". The usual drum heads 8" are provided and are connected by T-beams, similar to beams 23, which support spaced cylindrical screens or grids 26" and 30 having a filter bed or other treating unit 32 interposed therebetween, and which further support cylindrical screens or grids 53 and 24" with the filter bed or other treating unit 33 interposed therebetween, a quieting space or annular chamber 31 being arranged between the grid 30 and grid 53. Each of the several grids 26", 30, 53, and 24" is substantially the same in detailed construction and mounting (except for possible variations in gauge) as the detailed features shown and described with respect to grids 26 and 24 of Figure 3. When the embodiment of Figures 12 and 13 is incorporated in a single end filter type or a vertical type, only one of the drum heads 8" is provided with the annular boss 10" cooperating with the part 9" of the casing to provide the labyrinth gland corresponding with the labyrinth gland seen in Figure 8, but, of course, when the structure seen in Figures 12 and 13 is of the double end type, as shown in Figure 1, two of the labyrinth glands will be employed. The hub and spoke section in the embodiment of Figures 12 and 13 varies only in detail from that above described and includes the short spokes 22" and the impeller blades 16" having a hub keyed to the drive shaft 5". Mounted within the space surrounded by the grid 26" and disposed concentric to said grid and to the shaft 5" is the quieting cylinder 13" having the slots 14" for the free lateral flowing of fluid. The cylinder 13" is spaced from the grid 26" to provide the quieting area 17" which is open at its end to communicate directly with the influent space 18" as is also the end of the cylinder 13".

The structure just described, as seen in Figures 12 and 13, functions largely as described with respect to Figure 4, except that the bed 32 is preferably of coarser material than the bed 33, and the quieting area 31 affords additional opportunity for insurance against longitudinal surging of fluid, and, therefore, insures radial advance both under the fluid pressure head and the centrifugal force to increase the rate of filtering action without sacrificing effectiveness thereof.

The cleansing action in the operation of the structure seen in Figures 12 and 13 is obtained by the reverse current, as set forth in the operation of the above described structures. The cleansing action is also preferably supplemented by cleansing jets from appropriate nozzles 54 similar in construction and function to those previously described.

What is claimed is:

1. The combination, with a housing, of a filter drum rotatably mounted therein, a filter bed carried by the drum, means for rotating the drum and filter bed, a supply intake for fluid to be filtered, and means for providing a quiet area between the supply intake and the filter bed, while maintaining passage of liquid therethrough under centrifugal force.

2. The combination, with a housing, of a filter drum rotatably mounted therein, a filter bed carried by the drum, a supply intake for delivering fluid to the drum along a path substantially parallel to the axis of rotation of the drum, and means providing a quiet area between the path of advance of the fluid to be filtered and the filter bed, while maintaining passage of liquid therethrough under centrifugal force.

3. The combination, with a housing, of a filter drum rotatably mounted therein, a filter bed carried by the drum, means for delivering fluid to the drum along a path substantially parallel to the axis of rotation of the drum, means for changing the direction of movement of the fluid to be filtered to cause the fluid to approach the drum radially, and means providing a quiet area between the filter bed and the direction changing means.

4. The combination, with a housing, of a drum rotatably mounted therein, a cylinder co-axial with the drum and formed with openings for enabling passage of fluid to be filtered through the cylinder to the drum in a direction substantially radially of the drum, means for delivering fluid to be filtered to the cylinder, the cylinder and drum being spaced to provide an interposed quieting area, and means for delivering fluid simultaneouly to the cylinder and said quieting area.

5. The combination, with a housing, of a drum rotatably mounted therein, a cylinder co-axial with the drum and formed with openings for enabling passage of fluid to be filtered through the cylinder to the drum in a direction substantially radially of the drum, means for delivering fluid to be filtered to the cylinder, the cylinder and drum being spaced to provide an interposed quieting area, means for delivering fluid simultaneously to the cylinder and said quieting area, and means for subjecting the fluid being delivered to the cylinder to an advancing stress additional to the advancing stress of the fluid delivered directly to the quieting area.

6. The combination, with a housing, of a filter drum rotatably mounted therein, a cylinder within said drum spaced therefrom and having radial discharging openings, and means for delivering fluid to be filtered to said cylinder and to the space between the cylinder and the drum.

7. The combination, with a housing, of a filter drum rotatably mounted therein, a cylinder within said drum spaced therefrom and having radial discharging openings, and means for delivering fluid endwise into the drum and simultaneously delivering fluid to be filtered into the space between the drum and cylinder.

8. The combination, with a housing, of a filter drum rotatably mounted therein, a cylinder concentric to and within and spaced from the filter drum, means for delivering fluid to be filtered endwise to said cylinder and to the space between said cylinder and drum, the cylinder being foraminous, and impeller blades arranged substantially at the intake end of the cylinder to rotate with the filter drum and increase the advancing stress of the fluid entering the cylinder.

9. The combination, with a housing, of a filter drum rotatably mounted therein, means for delivering fluid to the filter drum spaced therefrom to provide a quieting area between said delivering means and drum, and means for delivering cleansing jets to the drum within said quieting area.

10. In a centrifugal filter the combination of a filter drum rotatably mounted, a filter bed carried thereby, a second cylindrical filter bed concentric with and spaced from the first filter bed to form an open space therebetween comprising a non-turbulent area, and means housing said drum and filter beds and having an intake for fluid to the influent surface of one of the filter beds and an exhaust for fluid from the effluent surface of the other, the drum being sealed about those areas corresponding to the ends of said space between the beds.

11. The combination of a filter drum rotatably mounted, a filter bed carried thereby, a second cylindrical filter bed concentric with and spaced from the first filter bed, and means housing said drum and filter beds and having an intake for fluid to the influent surface of one of the filter beds and an exhaust for fluid from the effluent surface of the other, said drum having means for preventing escape of fluid from the space between the filter beds except through one of the filter beds, the space between the filter beds being adapted to serve as a quiet area, and means for providing a quiet area between the intake of the housing and the influent surface of the second-mentioned filter bed.

In testimony whereof I affix my signature.

ARTHUR S. HARRINGTON.